United States Patent [19]

Vaughan et al.

[11] Patent Number: 5,471,127
[45] Date of Patent: Nov. 28, 1995

[54] INDUCTION MOTOR CONTROL

[75] Inventors: Mark C. V. Vaughan; Simon P. Vaughan, both of Cornwall, England

[73] Assignee: Energy Reduction International Ltd., England

[21] Appl. No.: 238,154

[22] Filed: May 4, 1994

[51] Int. Cl.⁶ .................................................. H02P 5/28
[52] U.S. Cl. .................. 318/809; 318/727; 318/729; 318/812; 318/806; 318/798
[58] Field of Search .................................. 318/727, 729, 318/812, 806, 798, 809

[56] References Cited

U.S. PATENT DOCUMENTS

| | | | |
|---|---|---|---|
| 4,242,625 | 12/1980 | Hedges | 318/729 |
| 4,297,628 | 10/1981 | Hedges | 318/778 |
| 4,298,834 | 11/1981 | Opfer | 318/729 |
| 4,369,403 | 1/1983 | Lee | 318/729 |
| 4,388,578 | 6/1983 | Green et al. | 318/729 |
| 4,404,511 | 9/1983 | Nola | 318/729 |
| 4,430,607 | 2/1984 | Muth | 318/729 |
| 4,451,112 | 5/1984 | Hattori et al. | 318/778 |
| 4,461,986 | 7/1984 | Maynard et al. | 318/778 |
| 4,468,603 | 8/1984 | Vander Meer et al. | 318/729 |
| 4,539,514 | 9/1985 | Espelage et al. | 318/778 |
| 4,636,702 | 1/1987 | Hedges | 318/729 |
| 4,689,542 | 8/1987 | Ibori et al. | 318/778 |
| 4,800,326 | 1/1989 | Unsworth | 318/729 |
| 4,912,390 | 3/1990 | Curran, Jr. et al. | 318/812 |
| 5,077,512 | 12/1991 | Weber | 318/776 |
| 5,129,255 | 9/1992 | Weber | 318/775 |

*Primary Examiner*—William M. Shoop, Jr.
*Assistant Examiner*—Karen Masih
*Attorney, Agent, or Firm*—James H. Dautremont

[57] ABSTRACT

An induction motor is operated at a high electrical efficiency level by employing a line current peak detector in conjunction with an electronic phase angle controller and a microprocessor system controller. If the line current peaks remain substantially constant the phase angle controller increases a phase gap in the applied line voltage to a width incrementally greater than a full-load value, at which point the line current peak value increases substantially. The increase in line current peak value is sensed by the line current peak detector and a signal is transmitted to the microprocessor system controller which in turn automatically adjusts the control input to the phase angle controller in order to incrementally decrease the existing phase gap in the output of the phase angle controller. Varying mechanical loads are therefore automatically accommodated while keeping the motor running efficiently.

13 Claims, 9 Drawing Sheets

INDUCTION MOTOR CONTROL

BACKGROUND OF THE INVENTION

1. Field of the Invention

This invention relates to induction motor control systems, and, more particularly, to systems for automatically controlling the power factor and corresponding efficiency of an induction motor that is subjected to varying mechanical loads.

2. Description of the Prior Art

Figure 1A:
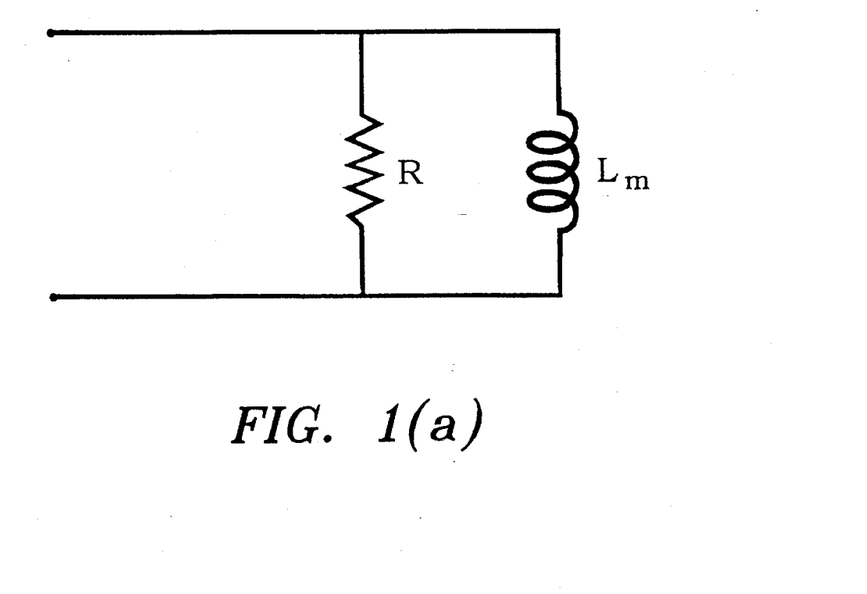
FIG. 1(a) is a first-order electrical model of an induction motor.
Figure 1B:
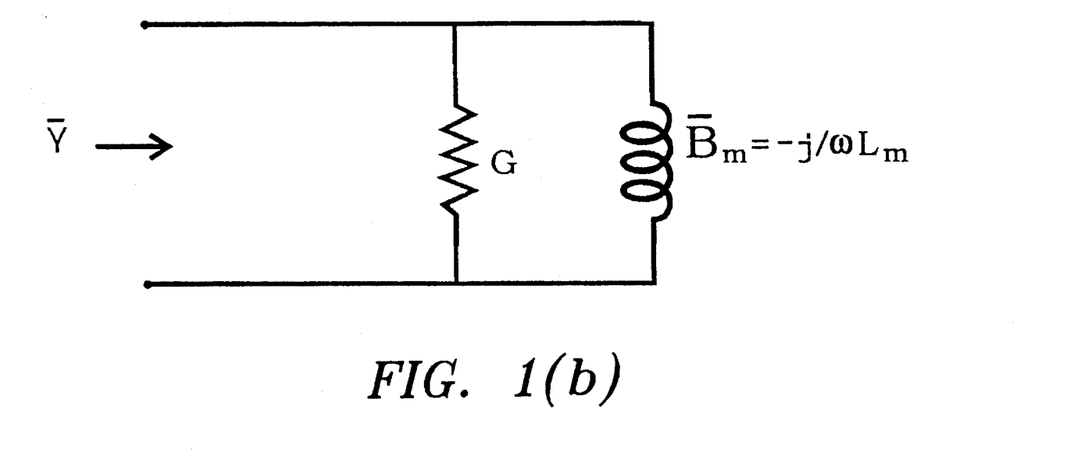
FIG. 1(b) is a frequency-domain representation of the model of FIG. 1(a)
Figure 2A:
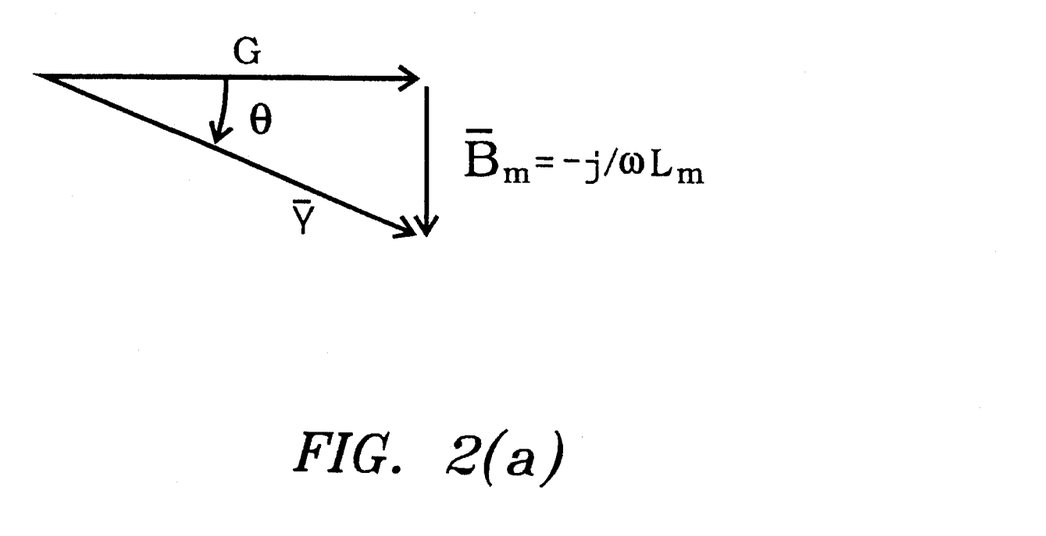
FIG. 2(a) is a general vector diagram representing the admittance of the model of FIG. 1(b)
Figure 2B:
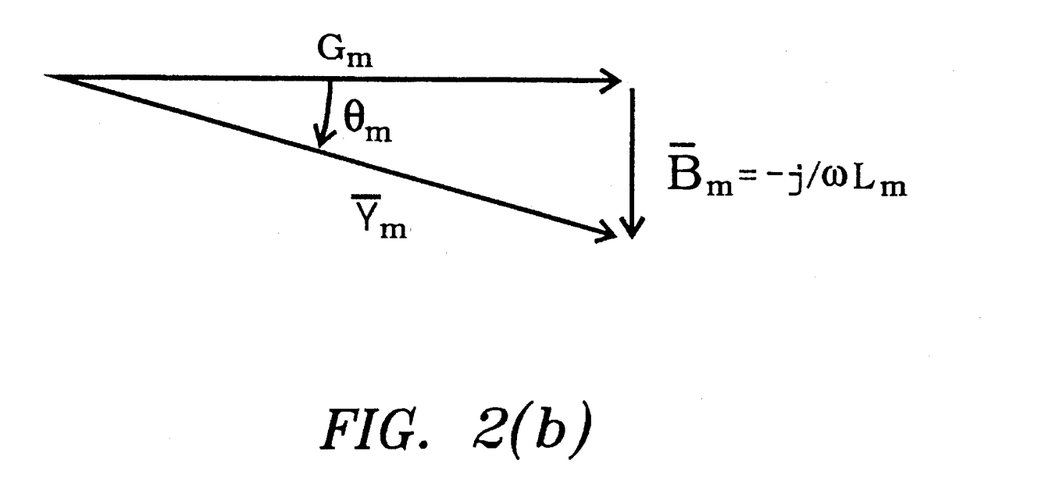
FIG. 2(b) is a vector diagram representing the maximum full-load admittance of the model of FIG. 1(b)

Neglecting wire resistance and friction and other second-order effects, a useful first-order electric model of an induction motor is depicted in FIG. 1(a), wherein R represents the electrical power dissipating element of the motor (i.e., the element that absorbs the power that is converted by the motor into mechanical power) and $L_m$ represents the effective collective inductance of the motor's windings. This model, converted into the "frequency domain" as per Steinmetz, becomes the conductance G (i.e., $1/R_m$) in parallel with the susceptance $\overline{B_m}$ (i.e., $1/j\omega L_m$ or $-j/\omega L_m$) as shown in FIG. 1(b). In the complex plane G and $\overline{B_m}$ add vectorially to yield the overall admittance $\overline{Y}$ of the motor model (i.e., $\overline{Y}=G-j/\omega L_m$) as depicted in FIG. 2(a). At full rated mechanical load for the motor the corresponding model value of G is at its highest acceptable magnitude $G_m$ as shown in FIG. 2(b) (corresponding to the lowest acceptable magnitude of R which dissipates the maximum allowable electrical power for the motor as rated). The minimum phase lag angle, $\theta_m$ (i.e., Arctan $1/G_m \omega L_m$), defines the steady state phase lag of the fully-loaded motor's substantially sinusoidal current with respect to the applied sinusoidal line voltage $\overline{V_s}$, i.e., $$\overline{I_m}=|\overline{V_s}|(\sqrt{\sqrt{G^2_m+|B_m|^2}})\angle\theta_m.$$

Figure 3A:
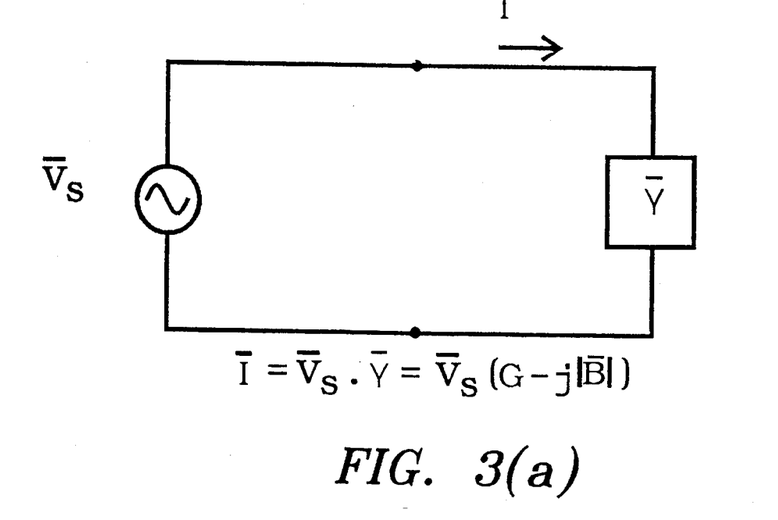
FIG. 3(a) is a circuit diagram of the model of FIG. 1(b), showing the applied line voltage and the resultant line current.
Figure 3B:
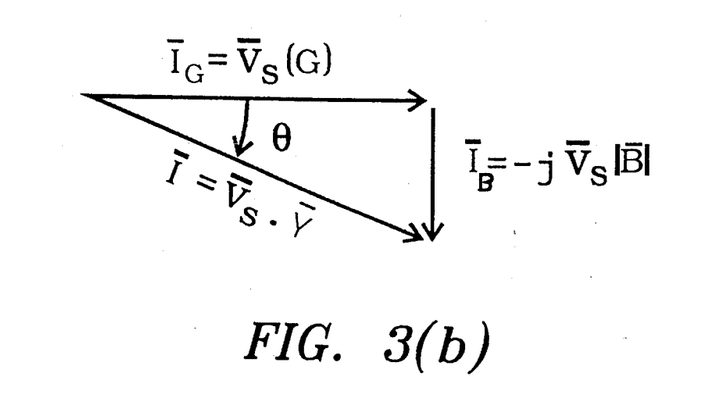
FIG. 3(b) is a vector diagram of the current of FIG. 3(a)

Generally the load current $\overline{I}$ of an induction motor lags the applied voltage $\overline{V_s}$ by $\theta$ radians as depicted in FIGS. 3(a) and 3(b), wherein $$\overline{I}=\overline{V_s}\cdot\overline{Y}=\overline{V_s}(G-j|\overline{B}|),$$

or $$\overline{I}=(\overline{V_s})(G)-j(\overline{V_s})(|\overline{B}|)=\overline{I_G}-j\overline{I_B}.$$

Figure 4:
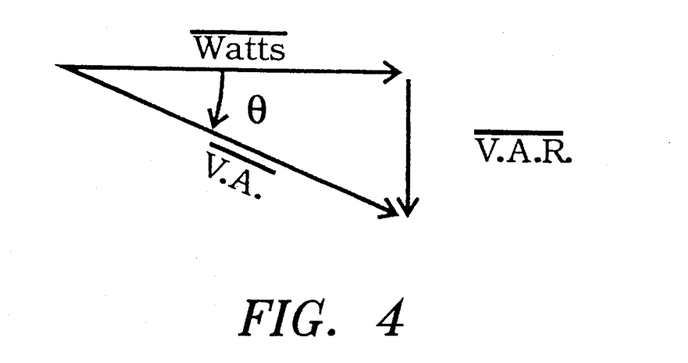
FIG. 4 is power vector diagram of the circuit depicted in FIG. 3(a)

FIG. 4 differs from FIG. 3(b) only in that each current vector has been multiplied by the applied voltage vector to yield the "power" diagram wherein:

$$\overline{Watts}=|\overline{V_s}|^2 G=|\overline{V_s}|\cdot|\overline{I_G}|;$$

$$\overline{V.A.R.}=\text{Volt-Amperes-Reactive}=|\overline{V_s}|^2\cdot|\overline{B}|=|\overline{V_s}|\cdot|\overline{I_B}|;$$

$$\overline{V.A.}=\text{Volt-Amperes}=|\overline{V_s}|^2\cdot|\overline{Y}|=|\overline{V_s}|\cdot|\overline{I}|;$$

and $$\overline{V.A.}=\overline{WATTS}-j\overline{V.A.R.}$$

The Power Factor ("P.S.") is a measure of the relationship between the magnitude of $\overline{V.A.}$ and the magnitude of $\overline{Watts}$ and is defined as $$P.F.=\cos\theta=\cos[(\text{Arctan}(|\overline{I_B}|/|\overline{I_G}|)]$$

or, $$P.F.=\cos[\text{Arctan}(|\overline{V.A.R.}|/|\overline{Watts}|)]$$

Figure 5:
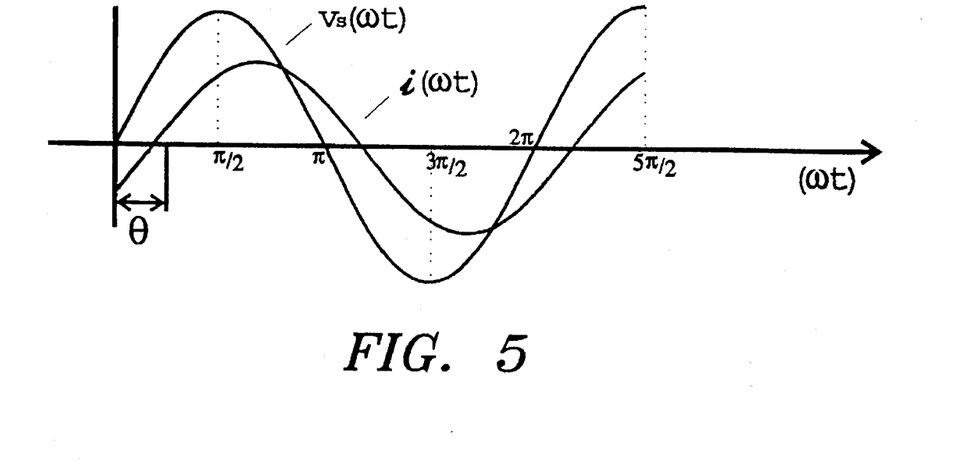
FIG. 5 is a plot of the voltage applied to an induction motor and the resultant motor current.
Figure 6:
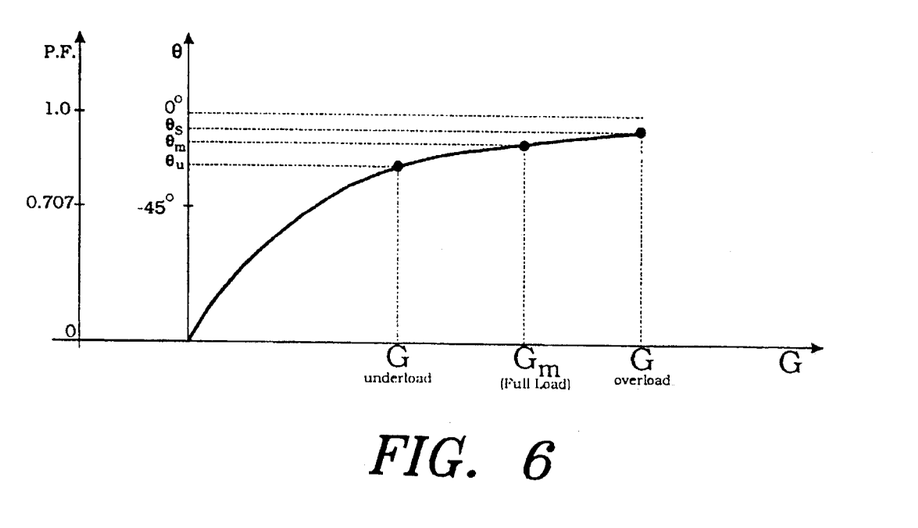
FIG. 6 is a plot of the power factor and phase shift of an induction motor as a function of the motor's electrical conductance, up to and past the full-load conductance.

The phase lag, whether expressed in radians or as a power factor, corresponds to a "real time" lag of $\Delta t=\Theta/\omega$ wherein $\omega$ is the angular frequency of the applied voltage. So, the input voltage and current to this simplified model of an uncompensated induction motor are both substantially sinusoidal, but out of phase as shown in FIG. 5. An induction motor has a continuously variable amount of phase shift which varies inversely with the mechanical load (i.e., torque) applied on the motor's rotating shaft. In other words, a fully-loaded induction motor has only a small phase shift (i.e., a high power factor), whereas a lightly-loaded induction motor will display a relatively large phase shift (as depicted in FIG. 2(a) wherein $G<G_m$ but $\overline{B_m}$ remains substantially constant so that $\theta>\theta_m$) i.e., a lowered power factor. A reduced power factor implies an undesirably high amount of current flowing into the motor for the corresponding amount of mechanical power produced. When the motor is under-loaded, G becomes lower than $G_m$, whereas $\overline{B_m}$ remains substantially constant. Hence the lag angle $\theta$ increases and the motor's Power Factor (P.F.) decreases. FIG. 6 depicts this relationship. Note that when $G>G_m$, an overload condition exists and when $\theta$ reaches $\theta_s$, the motor will stall. For industrial loads, a low power factor condition is a significant problem for the power company supplying the electricity. This is due to the fact that the power company loses a significant amount of power along its transmission lines in so-called "I²R" losses. These losses obviously increase at an increasing rate as the current supplied increases. It is therefore necessary for power companies to charge a premium price for power supplied at a low power factor.

To avoid this waste of energy and loss of revenues, industrial users routinely employ means to "correct" (i.e., raise) the power factors of their loads. The classical approach is to connect a bank of capacitors across the industrial plant's input power lines. There are two major problems with this approach: (1) the correction is a fixed one, so that if the industrial load varies (as they all do) the correction becomes either less effective or, conversely, potentially overly effective, resulting in an undesirably low leading power factor; and, (2) many industrial capacitor banks have inherently unpredictable maintenance problems.

It would therefore be highly desirable to have a system that would automatically correct the power factor of an induction motor in real time (i.e., "on the fly"), so that the motor runs at or near optimum efficiency continuously as the applied mechanical load is varied.

Figure 7A:
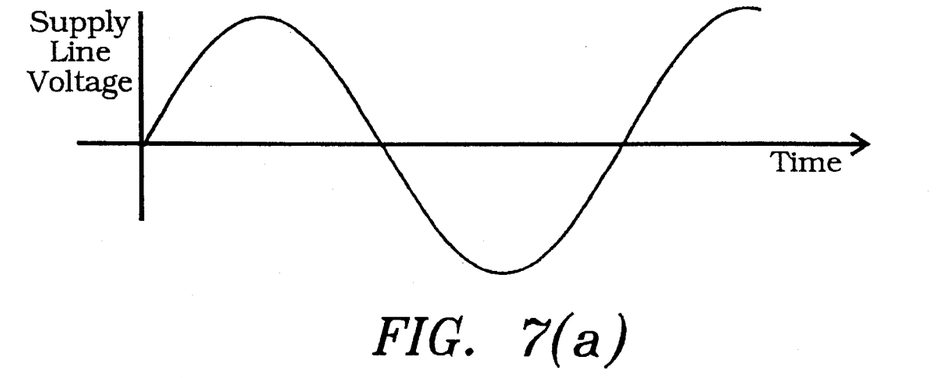
FIG. 7(a) shows the waveform of a typical sinusoidal supply line voltage.
Figure 7B:
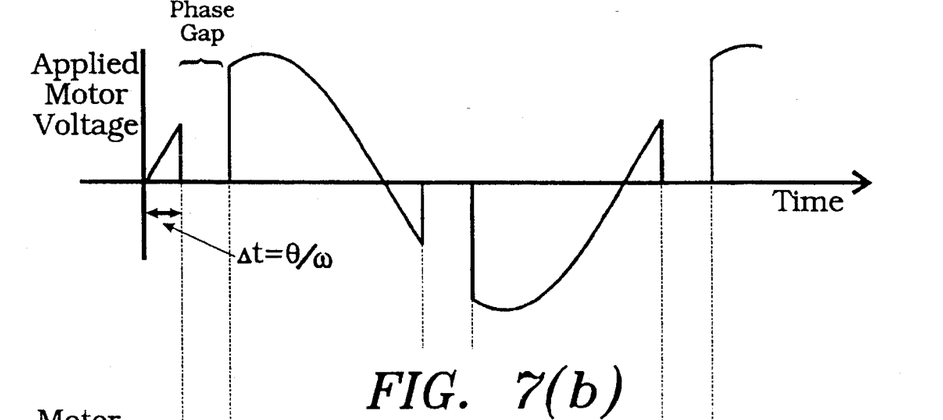
FIG. 7(b) shows a typical phase-controlled voltage as applied to an induction motor.

In order to accomplish this it is useful to note that the "full-load" condition of an induction motor is directly proportional to the line voltage applied to the motor; i.e., if an induction motor is underloaded at a given line voltage, then one way to get the motor back to a "fully-loaded" condition is to reduce the effective voltage applied to the motor by phase control of the applied voltage. This well-known technique is typically implemented with Triacs or SCR groups that are put in series with the motor across the supply line voltage. These devices are triggered part way through the supply line voltage cycle (typically when the motor current reaches the zero level) so that the voltage applied to the motor is reduced, not in peak value, but in average value due to the change in waveshape as depicted in FIGS. 7(a) and 7(b). The control signal determining the off-time for the Triacs or SCRs is an analog voltage signal that is synchronized with the supply line voltage and is made directly or indirectly proportional to a controlling quantity that is different for different systems.

By reducing the effective applied voltage such that the motor's new electrical load condition nearly matches its actual applied mechanical load, the electrical motor losses are significantly reduced and the overall efficiency of the motor is improved.

Various approaches have been employed in the prior art to accomplish some control of induction motors to improve their efficiency.

U.S. Pat. No. 4,388,578 discloses an example of a power factor controller for an induction motor which produces a signal proportionate to the magnitude of the motor's load phase angle (measured by "zero crossings" of line voltage and line current) and uses that signal to adjust the power supplied to the motor.

U.S. Pat. No. 4,242,625 discloses an induction motor controller that makes use of the "slip speed" of the motor to control its applied voltage. Since slip speed is directly related to the applied mechanical load, it is used as a measure of the mechanical loading, and the phase angle controlled voltage to the motor is automatically adjusted accordingly to attempt to maintain a substantially constant slip speed.

U.S. Pat. No. 4,636,702 discloses an induction motor controller that attempts to measure the presumed sinusoidal peak line current value by measuring the slope (i.e., time rate of change) of the line current near the current "zero crossing." The peak current level signal thus deduced is then used as an indication of the percent loading (as compared to full loading) of the motor, and serves as a control signal to determine the appropriate phase angle controlled voltage to be applied to the motor.

These approaches described above are somewhat useful in special applications, but all are limited in effectiveness by problems such as over-compensation with the concurrent potential for motor stalling, lack of sensitivity of control, or failure to recognize non-sinusoidal current waveforms.

It is therefore an object of this invention to provide an improved approach for induction motor efficiency enhancement that is less likely to result in possible motor stalling.

It is another object of this invention to provide an improved approach for induction motor efficiency enhancement that is highly sensitive to "underloading".

It is yet another object of the instant invention to provide an improved approach for induction motor efficiency enhancement that works well notwithstanding the non-sinusoidal current waveforms associated with many industrial induction motors.

SUMMARY OF THE INVENTION

In accordance with the principles of the instant invention, the peak magnitude per half cycle of the motor current waveform is monitored directly as traditional phase angle control is imposed on the voltage supplied to the motor. The inventors have observed by their experimental research that the peak value per half cycle of motor current, i.e. the "current peak," remains substantially constant, for a constant mechanical load, as the phase gap in the applied motor voltage is gradually increased by the phase controller until the point of optimum motor efficiency is reached.

If the phase gap is increased too much, the motor current peaks start to increase and this increase is detected by a current peak sensor that is connected to a current peak input of the system controller. The system controller is either an analog controller or microprocessor-based. In either case the system controller is designed to respond to an increase in motor current peak value (i.e., above the immediately-previous peak level) by sending a signal to the phase controller that causes the phase controller to reduce the phase gap slightly which in turn causes the motor current peak to be reduced slightly back towards the most recent current peak level. The system thus continuously seeks the optimum motor efficiency point while at the same time avoiding over-compensation and motor stalling.

If the motor's mechanical load increases, the current peak will rise above the immediately-previous peak level, and the system will automatically decrease the phase gap until the current peaks settle back to the immediately previous level. If the motor load decreases, the system will once again automatically gradually increase the phase gap only until the current peaks start to rise above the immediately-previous peak level, as described above. Thus the system is suitable for continuously controlling induction motors that have time-varying mechanical loads.

The system performs well both with single and multi-phase induction motors that have substantially sinusoidal current waveforms and as well as with dual path motors that have significantly distorted non-sinusoidal current waveforms. In any case, as the inventors have discovered, for a constant mechanical load, values of the motor current peaks remain substantially constant over a relatively broad range of phase gap values, up to and including the optimum phase gap. Hence, the system is useful for controlling induction motors in a broad spectrum of horsepower ratings, i.e., from fractional horsepower shop motors to high horsepower industrial motors.

BRIEF DESCRIPTION OF THE DRAWINGS

For better understanding of the invention, reference may be made to the accompanying drawings in which.

DETAILED DESCRIPTION OF A PREFERRED EMBODIMENT

Figure 7C:
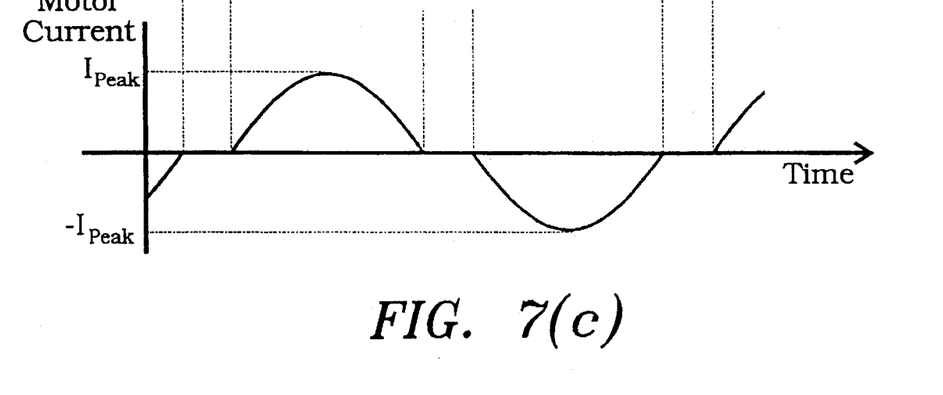
FIG. 7(c) shows the approximate current diagram corresponding with the phase-controlled voltage of FIG. 7(b)
Figure 8:
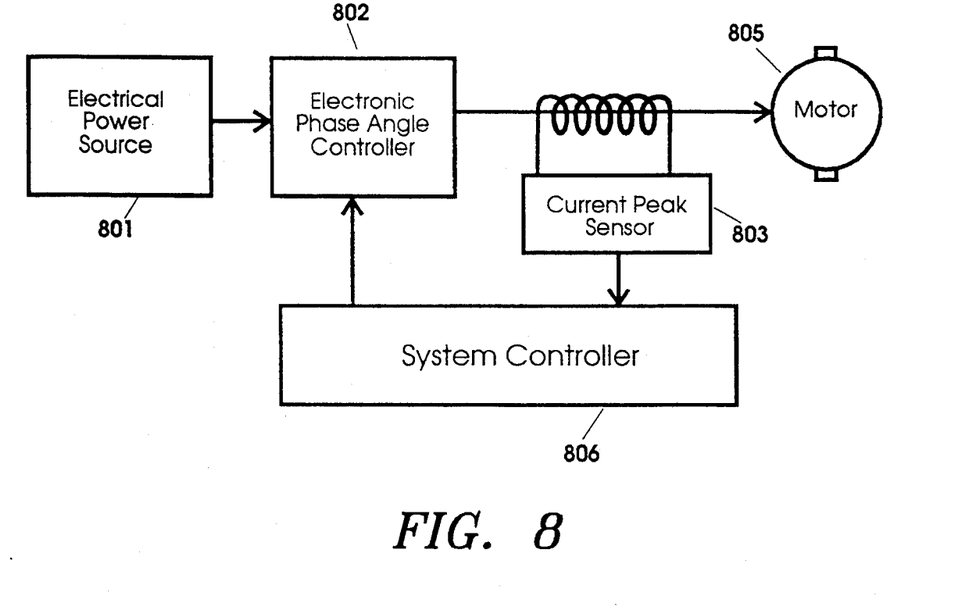
FIG. 8 shows a block diagram of a preferred embodiment of the instant invention.

Referring now to FIG. 8, therein is depicted a block diagram of a system employing the principles of this invention. Therein, power source 801 supplies a line voltage as depicted in FIG. 7(a) to a standard electronic phase angle controller 802 (as is well-known in the art), which is controlled by the output of system controller 806, preferably a SGS-Thomson ST6 series microcontroller/microprocessor or the equivalent which has built-in analog-to-digital converters. The construction of phase angle controller 802 is well-known to those skilled in the art. Controller 802 sends its load current as depicted in FIG. 7(c) through peak current sensor 802 (which in the preferred embodiment, comprises a current transformer that isolates the load current and provides a proportionate time waveform of voltage) and on to induction motor 805. System controller 806 continuously receives data from current peak sensor 803 and compares each current cycles' previous peak value with its immediately-subsequent presently-measured value and then sends a suitable analog control signal to electronic phase angle controller 802. Controller 806 also determines the current zero crossings from which the phase gap counters are started, as is well known to those skilled in the art of phase gap controllers.

After providing for a suitable time delay to allow the motor to get through the start-up phase and reach a steady state, system controller 806 establishes an initial value of the motor's current peak level. Once this is accomplished, system controller 806 signals phase angle controller 802 to create a small phase gap in the applied motor voltage as shown in FIG. 7(b). The next measured peak current level is then compared with the motor's immediately-previously established current peak level. If no substantial increase in current peak value is detected, then system controller 806 signals phase angle controller 802 to again slightly increase the phase gap in the applied motor voltage. This routine continues for each cycle of source voltage until a substantial increase in peak current occurs, at which point system controller 806 signals phase angle controller 802 to slightly decrease the phase gap in the applied motor voltage. In this manner system controller 806 causes the motor to operate just at its peak efficiency level for that particular mechanical load, while at the same time preventing the motor from stalling.

Figure 9A:
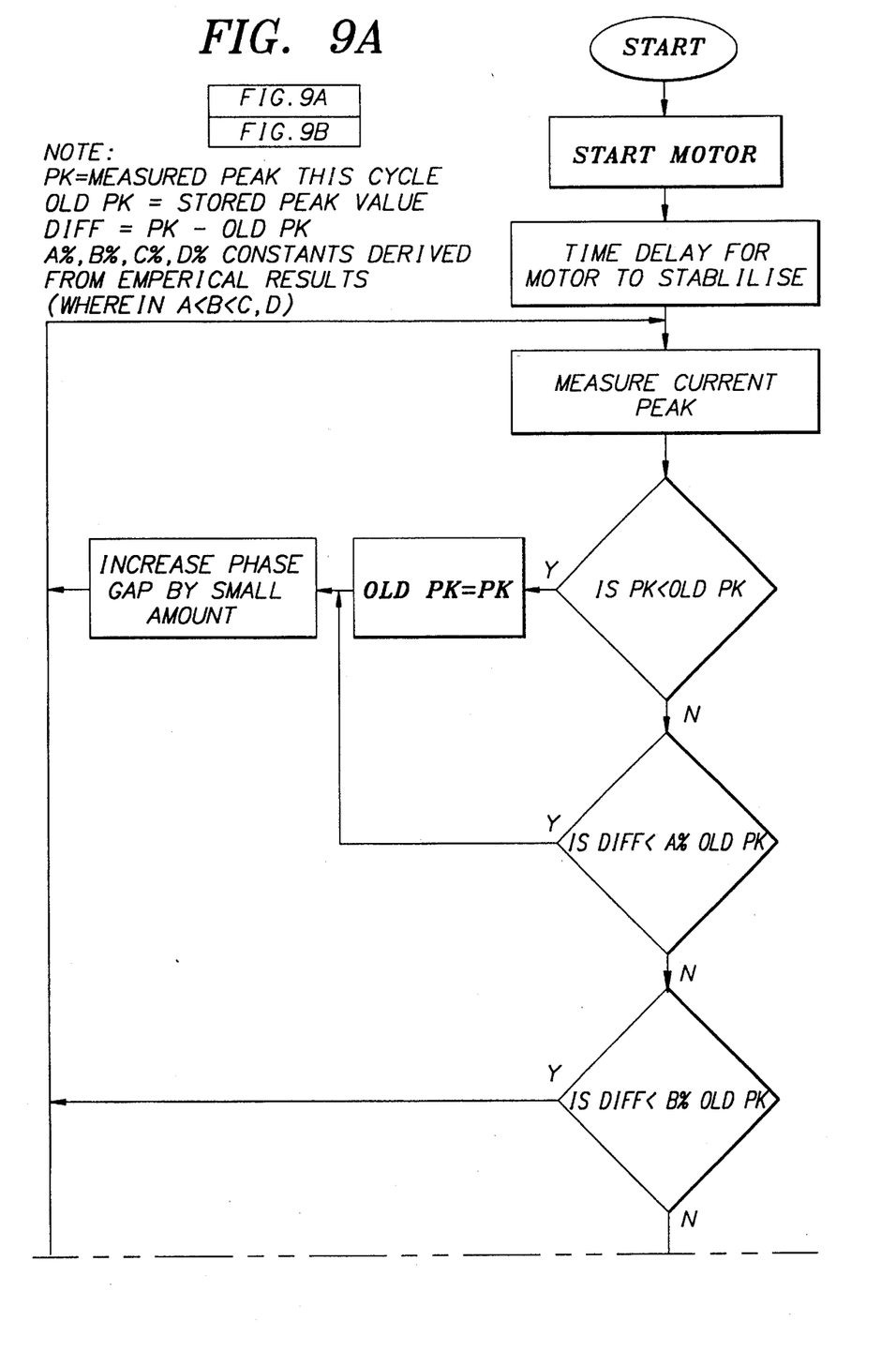
FIG. 9 is a flow diagram of the microprocessor program for the controller of FIG. 8.
Figure 9B:
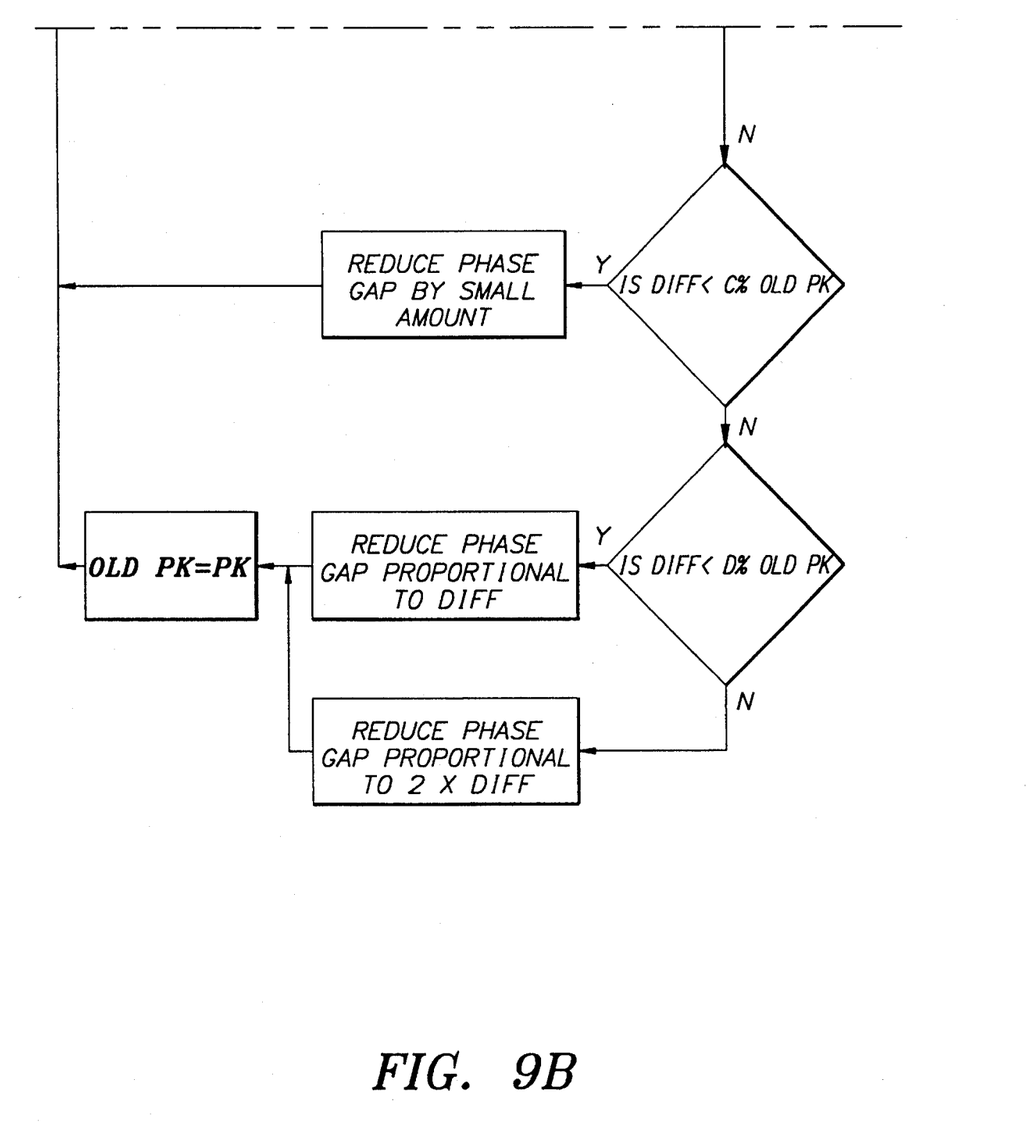

The program flow chart of system controller 806 is shown in FIG. 9. The system operates by effectively minimizing the current peak value. It does this by storing the present current peak value and then increasing the phase gap by a very small amount Δt, and comparing the new current peak value with the immediately-previously stored value. It follows the following steps in numerical sequence:

1. If the current peak value has reduced, then the controller increases the phase gap by Δt again and changes its stored peak for the new peak.

2. If the difference between the new current peak and the stored value is less than A% of the stored value then the phase gap is again increased by Δt. This allows for a small designated fluctuation in current peaks inherent in the system. Note here the new value is not stored, this is in case several small changes occur which will then constitute a larger change so action can be taken if necessary.

3. If the difference between the new current peak and the stored value is less than B% but greater than A% of the stored value then no change in the phase gap takes place.

4. If the difference between the new current peak and the stored value is less than C% of the stored value but greater than B% then the phase gap is reduced by Δt. Note here the new value is not stored. In this manner a gradual increase in load over several cycles will cause a more radical peak change so that more radical action can be taken.

5. If the difference between the new current peak and the stored value is less than D% of the stored value but greater than C% then the phase gap is reduced by a larger amount proportional to the difference in the peaks. The stored peak is changed for the new peak value.

6. If the difference in peaks is ≧D% then the phase gap is reduced by an even larger amount proportional to twice the difference in peaks, again the stored value is changed for the new value.

If the load on the motor remains constant the controller will only cycle through areas 1, 2, 3 & 4 as detailed above, if the load reduces the current peaks reduce and so cycling through 1 allows for this, if the motor load is increased routine 4, 5 & 6 reduce the phase gap as required. Note: A<B<C<D.

Figure 10:
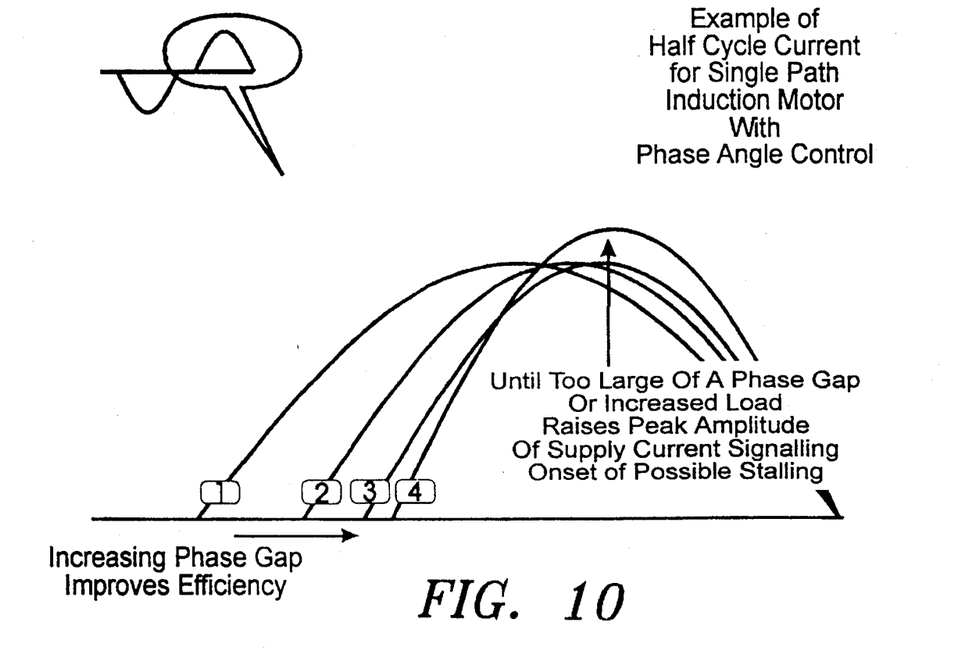
FIG. 10 is a representation of several half cycle single-phase induction motor current waveforms for various amounts of phase gap.

FIG. 10 shows graphically the steps of the above-described process wherein the applied voltage phase gap associated with current waveform No. 3 is the maximum-efficiency phase gap.

Figure 11:
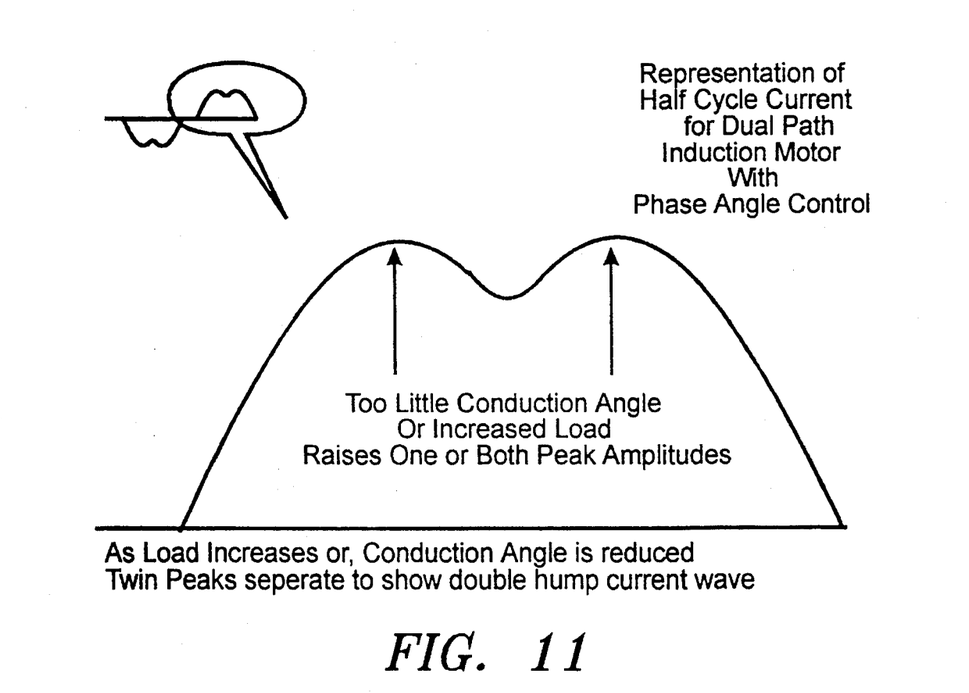
FIG. 11 is a representation of a half-cycle of a dual path induction motor current waveform.

FIG. 11 depicts a typical non-sinusoidal half-cycle current waveform that can occur in a polyphase induction motor that is subjected to phase-angle control. The system of this invention works for such waveforms because the system depends only on measurements made of the peak value of the motor current waveform, whatever its waveshape may be.

Herein has been disclosed the preferred embodiment of the instant invention as currently understood and contemplated. However, it is to be emphasized that various design changes, such as designing the system controller with analog circuitry instead of using a microprocessor, can be made by those skilled in the art without departing from the spirit and scope of the invention as recited in the following claims.

What is claimed is:

1. A method for controlling the electrical efficiency of an induction motor that is subject to mechanical loads that can vary with time, by employing a phase controller in series with the motor's supply line voltage comprising the following steps:

(a) measuring a reference current peak value supplied to said motor;

(b) incrementally increasing a phase gap in the line voltage applied to said motor, until an increase more than a predetermined amount in an immediately-subsequent current peak value occurs;

(c) incrementally reducing said phase gap to a magnitude incrementally narrower than the phase gap that caused the occurrence of said increase more than a predetermined amount in said immediately-subsequent current peak value in step (b) ; and (d) repeating steps (a), (b), and (c) sequentially as the motor runs.

2. The method of claim 1 wherein said line voltage is sinusoidal.

3. The method of claim 1, wherein the steps thereof are accomplished by use of a microprocessor.

4. A method for optimizing the electrical efficiency of an induction motor comprising the steps of:

(a) starting said motor by applying an alternating line voltage thereto;

(b) providing for a time delay to allow said motor to reach a steady state;

(c) measuring and storing a first reference current peak magnitude of said motor;

(d) creating an incremental phase gap in said line voltage;

(e) measuring and storing said motor's subsequent reference current peak magnitude;

(f) comparing said subsequent current peak magnitude with said first reference current peak magnitude;

(g) incrementally increasing the width of said phase gap if and only if said subsequent reference current peak magnitude is not more than a predetermined amount greater than said first reference current peak magnitude;

(h) repeating steps (c) through (f) for subsequent reference current peak magnitudes until a subsequent reference current peak magnitude becomes more than said predetermined amount greater than its immediately-previous reference current peak magnitude;

(i) incrementally decreasing the width of said phase gap; and (j) repeating steps (c) through (i) continuously as said motor is subjected to varying mechanical loads.

5. The method of claim 4, wherein said alternating line voltage is sinusoidal.

6. The method of claim 4, wherein said storing and said comparing are accomplished by the use of a microprocessor.

7. The method of claim 4, wherein said measuring is accomplished by use of a current transformer.

8. The method of claim 4, wherein said creating of an incremental phase gap in said line voltage is accomplished by use of an electronic phase angle controller.

9. The method of claim 8, wherein said electronic phase angle controller is responsive to a comparator output of a system controller comprising a microprocessor.

10. A system for controlling an induction motor comprising:

A.C. electrical power source means incremental electronic phase angle controller means disposed between, and electrically connected to, said power source means and said motor;

current peak sensor means, responsive to current peaks in the electrical connection between said phase angle controller means and said motor; and system controller means, responsive to the output of said current peak sensor means, for providing an electrical control signal to said phase angle controller means;

whereby a phase gap is introduced into the voltage signal of said electrical power signal and is incrementally increased in width for each half cycle of said A.C. electrical power source until said current peak sensor means detects an increase more than a predetermined amount in said current peak with respect to an immediately-preceding current peak, whereupon said system controller means signals said phase angle controller means to incrementally reduce said phase gap, and whereby said system controller means in conjunction with said phase angle controller means and said current peak sensing means, continuously monitors and optimizes the electrical efficiency of said motor under varying mechanical loads.

11. The system of claim 10 wherein said A.C. electrical power source means comprises a sinusoidal electrical voltage.

12. The system of claim 10 wherein said system controller comprises a microprocessor.

13. The system of claim 10 wherein said peak current sensor means comprises a current transformer.

* * * * *